(12) United States Patent
Ingram et al.

(10) Patent No.: US 12,174,743 B2
(45) Date of Patent: Dec. 24, 2024

(54) MEMORY ACCESS

(71) Applicant: Arm Limited, Cambridge (GB)

(72) Inventors: Graeme Leslie Ingram, Cambridge (GB); Michael Jean Sole, Cambridge (GB); Erik Persson, Cambridge (GB)

(73) Assignee: Arm Limited, Cambridge (GB)

( * ) Notice: Subject to any disclaimer, the term of this patent is extended or adjusted under 35 U.S.C. 154(b) by 258 days.

(21) Appl. No.: 17/643,732

(22) Filed: Dec. 10, 2021

(65) Prior Publication Data
US 2022/0188038 A1  Jun. 16, 2022

(30) Foreign Application Priority Data

Dec. 15, 2020 (GB) ...................................... 2019835

(51) Int. Cl.
*G06F 12/08* (2016.01)
*G06F 3/06* (2006.01)
(Continued)

(52) U.S. Cl.
CPC ........ *G06F 12/0862* (2013.01); *G06F 3/0611* (2013.01); *G06F 3/0659* (2013.01);
(Continued)

(58) Field of Classification Search
CPC ............. G06F 12/0862; G06F 12/1027; G06F 12/1036; G06F 12/1045; G06F 12/1054;
(Continued)

(56) References Cited

U.S. PATENT DOCUMENTS

2007/0101066 A1* 5/2007 Al Sukhni .......... G06F 12/0862
711/137
2014/0281056 A1* 9/2014 Davda ................ G06F 12/1027
710/26
(Continued)

FOREIGN PATENT DOCUMENTS

EP  1988467 A1  11/2008
GB  2545398 A   6/2017

OTHER PUBLICATIONS

SpecTLB A Mechanism for Speculative Address Translation by Barr 2011 (Year: 2011).*
(Continued)

*Primary Examiner* — Paul M Knight
(74) *Attorney, Agent, or Firm* — EIP US LLP

(57) ABSTRACT

A method for triggering prefetching of memory address translations for memory access requests to be issued by a memory access component of a processor in a data processing system to a memory management function in the data processing system is provided. The method includes obtaining command data from one or more memory access commands in a sequence of memory access commands for the memory access component, predicting one or more memory addresses, for which one or more memory address translations are likely to be required by the memory management function to process one or more memory access requests, from the obtained command data, in response to the predicting, performing one or more trigger operations to trigger a prefetch of the one or more memory address translations, using the predicted one or more memory addresses, in advance of the one or more memory access requests.

12 Claims, 10 Drawing Sheets

(51) Int. Cl.
*G06F 12/0862* (2016.01)
*G06F 12/10* (2016.01)
*G06F 12/1027* (2016.01)
*G06F 12/1081* (2016.01)
*G06N 3/02* (2006.01)

(52) U.S. Cl.
CPC ............ *G06F 3/0673* (2013.01); *G06F 12/10* (2013.01); *G06F 12/1027* (2013.01); *G06F 12/1081* (2013.01); *G06F 2212/251* (2013.01); *G06N 3/02* (2013.01)

(58) Field of Classification Search
CPC ............ G06F 12/1063; G06F 12/1072; G06F 12/0835; G06F 12/1081; G06F 2212/621
See application file for complete search history.

(56) References Cited

U.S. PATENT DOCUMENTS

| | | |
|---|---|---|
| 2016/0350225 A1 | 12/2016 | Podaima et al. |
| 2018/0011651 A1* | 1/2018 | Sankaran ............ G06F 12/1009 |
| 2020/0065257 A1 | 2/2020 | Ghiggini et al. |
| 2020/0082280 A1 | 3/2020 | Orion et al. |
| 2023/0418773 A1* | 12/2023 | Guo ........................ G06F 13/28 |

OTHER PUBLICATIONS

Prefetch Aware Memory Controllers by Lee 2009 (Year: 2009).*
Survey of Recent Prefetching Techniques by Mittal 2016 (Year: 2016).*
Designing Fast Convolutional Engines for Deep Learning Applications by Spagnolo (Year: 2018).*
Convolution Engine: Balancing Efficiency and Flexibility in Specialized Computing by Qadeer (Year: 2015).*
Prefetched Address Translation by Margaritov (Year: 2019).*
NPL Chen Prefetching Irregular References for Software Cache 2008.*
NPL Garcia Adaptive Runtime Assisted Block Prefetching 2017.*
NPL Kurth Scalable and Efficient Virtual Memory Sharing in Heterogeneious SoCs 2018.*
NPL Lee Decoupled Direct Memory Access 2015.*
United Kingdom Combined Search and Examination report dated Apr. 19, 2021 for United Kingdom application No. GB 2019835.4.

* cited by examiner

MEMORY ACCESS

CROSS REFERENCE TO RELATED APPLICATION

This application claims priority pursuant to 35 U.S.C. § 119(a) and 37 CFR § 1.55 to United Kingdom Patent Application No. 2019835.4, filed on Dec. 15, 2020, which application is incorporated by reference in its entirety herein.

BACKGROUND

Technical Field

The present disclosure relates to methods and apparatus for triggering prefetching of memory address translations for memory access requests to be issued by a processor, in particular but not exclusively a processor designed to implement a convolutional neural network (CNN).

BACKGROUND

Processors designed to implement CNNs, such as neural processing units (NPUs) and other custom processors specifically adapted for CNN computations, as well as more generalized processors able to perform CNN computations, including central processing units (CPUs), graphical processing units (GPUs), digital signal processors (DSPs), etc., have on-board storage, for example in the form of static random-access memory (SRAM). In examples, the data processing system comprises a processor, wherein the processor comprises a memory access component, also called a memory access controller.

The processor may be a neural processing unit (NPU). An NPU is a processor designed to implement a CNN and may also be referred to as a neural network accelerator (NNA), a convolutional neural network accelerator (CNNA), a machine learning accelerator (MLA), or an artificial intelligence accelerator (AIA). An NPU includes an array of specialized convolution engines (CEs), which each contain for example multiply-accumulate (MAC) hardware to perform convolutional operations.

When implementing CNNs, it may not be possible for all of the data (including, for example, the input data, the output data, and data corresponding to the operations involved in the convolutional neural network) to be maintained on the processor's on-board storage. At least some of the data may be held in storage which is external to the processor; this may include system memory.

A processor may thus need to access the external memory when executing a convolutional neural network. The external storage may be accessed vis a memory management unit (MMU). An MMU may have associated storage, for example a cache, also known as a translation lookaside buffer, which stores memory address translations corresponding to locations in the external memory. The memory address translations are used to convert from memory addresses used by the processor to memory addresses identifying portions of external memory where the associated data is stored. Using virtual memory may allow scattered physical memory locations to appear as contiguous. They may also allow processes which operate on the same virtual address to access separate versions of the data stored in separate portions of physical memory. The translation lookaside buffer may not be able to store memory address translations for all memory address locations required for a computational process, for example a CNN inferencing process, due to capacity restrictions. Capacity restrictions may be imposed by desired properties, for example, a desired access speed, area, or cost. Where a memory location is to be accessed and the associated memory address translation is not already stored in the translation lookaside buffer, the memory address translation needs to be fetched in real time before the memory location can be accessed. Fetching may include accessing a secondary, larger storage, for example a larger cache, or may involve accessing a master page table comprising memory address translations for a larger system. This can introduce significant latency in a memory access, and overall increases the amount of time and resources needed to produce a CNN inference significantly.

It is desirable to increase the efficiency of memory access requests issued by a memory access component of a processor.

SUMMARY

In a first embodiment, there is provided a method for triggering prefetching of memory address translations for memory access requests to be issued by a memory access component of a processor in a data processing system to a memory management function in the data processing system, the method comprising: obtaining command data from one or more memory access commands in a sequence of memory access commands for the memory access component, predicting one or more memory addresses, for which one or more memory address translations are likely to be required by the memory management function to process one or more memory access requests, from the obtained command data, and in response to the predicting, performing one or more trigger operations to trigger a prefetch of the one or more memory address translations, using the predicted one or more memory addresses, in advance of the one or more memory access requests.

In a second embodiment, there is provided apparatus for triggering prefetching of memory address translations for memory access requests to be issued by a memory access component of a processor in a data processing system to a memory management function in the data processing system, the apparatus comprising: first circuitry for obtaining command data from one or more memory access commands in a sequence of memory access commands for the memory access component, second circuitry for predicting one or more memory addresses, for which one or more memory address translations are likely to be required by the memory management function to process one or more memory access requests, from the obtained command data, and third circuitry for, in response to the predicting, performing one or more trigger operations to trigger a prefetch of the one or more memory address translations, using the predicted one or more memory addresses, in advance of the one or more memory access requests.

In a third embodiment, there is a provided a data processing system comprising: a processor; a memory management function; and storage accessible by the processor via the memory management function, wherein the processor is configured to trigger prefetching of memory address translations, for memory access requests to be issued by the processor to the memory management function, by: obtaining instruction data from a sequence of instructions, predicting one or more memory addresses, for which one or more memory address translations are likely to be required by the memory management function to process one or more memory access requests, from the obtained instruction data, and in response to the predicting, performing one or more trigger operations to trigger a prefetch of the one or more memory address translations, using the predicted one or more memory addresses, in advance of the one or more memory access requests.

BRIEF DESCRIPTION OF THE DRAWINGS

Further features and advantages will become apparent from the following description of preferred examples, given by way of example only, which is made with reference to the accompanying drawings in which like reference numerals are used to denote like features.

DETAILED DESCRIPTION

Figure 1:
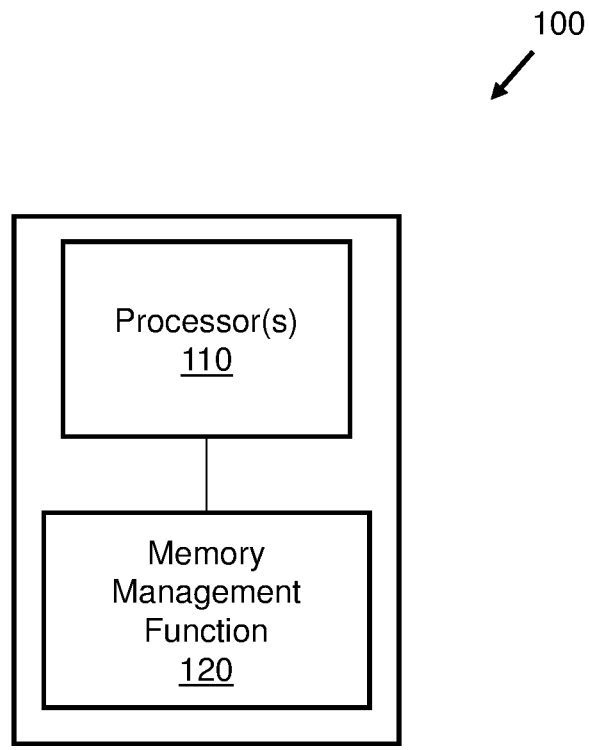
FIG. 1 is a schematic diagram illustrating apparatus according to an example.

Details of systems and methods according to examples will become apparent from the following description with reference to the Figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Certain examples described herein provide a method for triggering a prefetch of a memory address translation corresponding to a virtual memory address which is to be subsequently accessed in storage before a processor accesses the virtual memory address when implementing at least one layer of a CNN. Predicting that a virtual memory address is to be accessed and triggering a prefetch of a memory address translation corresponding to that virtual memory address prior to the virtual memory address being accessed may prevent a read or write operation from being delayed or stalled to determine the address of the relevant portion of physical memory. It is not desirable to delay, or stall, read or write operations as this may reduce processing throughput, which consequently introduces latency, reduces processing efficiency and wastes power.

Implementing at least one layer of a CNN may include both training phases, where the CNN is trained on sample data, and inferencing phases where the CNN is used to process data and to make inferences. The examples described herein may be of particular benefit when a processor implementing a CNN reads into or writes data out of an external memory via a memory management function.

When implementing at least one layer of a CNN memory access may be performed for a variety of data. Examples described herein may be applicable to accessing portions of memory when reading and/or writing input data, output data, data relating to the CNN such as data representing weights of kernels in at least one layer of the CNN, and/or bias data. Input data may relate to data input to a first layer of the CNN and data which is input to each subsequent layer of the CNN. Input data may include sensor data derived from one or more sensors such as image sensors, sound sensors, and other suitable forms of sensor data as described below. Input data may also include input feature maps, generated from performing operations on sensor data. In some examples, data input to a first layer of a CNN may be sensor data and data input to subsequent layers of the CNN may be referred to as input feature maps. Output data may relate to data output from a last layer of the CNN and data which is output when performing convolutions at each intermediate layer. Data which is output when implementing a convolutional layer on an input feature map or input data from a sensor may be referred to as one or more output feature maps. The data may be compressed or uncompressed.

Certain examples described herein determine when it is appropriate to trigger a prefetch of a memory address translation which is to be subsequently accessed based on a configuration setting corresponding to a capacity of cache storage, for example a translation lookaside buffer, which is used to store the memory address translations for use by a memory management function.

During a computational process involving the memory management function, memory address translations may be removed from the cache. In this case, determining when it is appropriate to trigger a prefetch of a memory address translation may be based on a configuration setting corresponding to a retention and/or eviction policy of memory address translations in the cache. In some implementations there may be a high level of precision with regards to storing only the most relevant memory address translations in the cache. This may allow the reduction of the size of the cache which may in turn reduce the time taken to find memory address translations in the cache, but increase the likelihood of a cache miss. Memory address translations may also be referred to as virtual memory address translation or simply virtual address translations.

FIG. 1 is a schematic diagram of apparatus 100 according to an example. The apparatus 100 may be comprised in a computing device. For example, the apparatus 100 may be part of a handheld computing device such as a smartphone, tablet device or general-purpose laptop computer. In such examples, the apparatus 100 may be used to implement a CNN, or at least one layer of a CNN, on data obtained by the computing device. Data which can be obtained by a computing device depends on the functionality of the device and sensors which are comprised in the device. This data may include image data, audio data, telemetry data, accelerometer data, global positioning system data, magnetometer data, light sensor data, fingerprint reader data, any other data which may be collected by a local sensor comprised in or on the computing device, or any data receivable over a local or wide area network through wired or wireless communication interfaces comprised in the computing device. Alternatively, the apparatus 100 may be used in another type of computing device, for example a computing device used in an autonomous vehicle, or in a robotics application where the CNN is used to process control data, sensory feedback data, or to provide any other suitable information processing.

The apparatus 100 comprises at least one processor 110 and a memory management function 120 for storing a plurality of memory address translations. Memory address translations may be translations between virtual memory addresses and physical memory addresses. These may be used where a CNN is being implemented using a virtual machine.

The at least one processor 110 may include a neural processing unit (NPU) which may also be called an AI accelerator or a neural network processing unit. In other examples, the at least one processor 110 may include another form of processor which has been configured to implement at least one layer of a CNN. For example, the at least one processor 110 may include a CPU, a GPU, a DSP, a coprocessor, or any other suitable processor. The apparatus 100 may further comprise one or more additional processors that are not configured to implement the at least one layer of the CNN. Examples of such additional processors include a Display Processor Unit (DPU) and a Video Processing Unit (VPU). The storage 120 may also be referred to as a cache or a translation lookaside buffer. The cache storage 120 may be part of a memory management unit (MMU) which handles memory address translations. In other examples, the storage 120 may be separate from the MMU but may communicate therewith. In certain examples, the storage 120 is a dedicated translation lookaside buffer which serves the at least processor 110, providing memory address translations used by the processor 110 to carry out operations. The apparatus 100 may comprise, or may be part of a device which comprises, further processors and storages where the cache storage 120 serves the at least one processor 110 and not the further processors.

The apparatus is configured to predict a virtual memory address likely to be used in an access transaction in relation to data held in storage which is external to the processor; and, in response to the predicting, performing one or more trigger operations to trigger a prefetch of one or more memory address translations. The one or more memory address translations may be stored in the cache storage 120 in advance of a subsequent access transaction requiring the memory address translations. The portion of memory which is external to the at least one processor may be any suitable form of memory. In some examples the apparatus 100 may comprise storage for holding at least some of input data, output data, and data representing at least part of the CNN. In other examples, the apparatus 100 may be communicatively coupled to various types of storage for storing at least some of input data, output data, and data representing at least part of the CNN. The types of storage which is used may be determined by a plurality of factors including: where the input data is stored, where the output data is to be written out to, and where the data corresponding to the CNN is stored. The size of the input data and/or output data which may determine whether it is able to be stored on board the processor. The memory accesses which are performed by the processor 100 when implementing the at least one layer of the CNN may be deterministic, or at least predominantly deterministic but scattered in physical memory. By storing the memory address translation in the cache storage 120 in advance of the predicted access transaction relating to the virtual memory address, the time taken to perform the predicted access transaction may be reduced.

When the processor 110 attempts to access a virtual memory address, the cache storage 120, known as a translation lookaside buffer, is accessed to determine the corresponding physical memory address. If the memory address translation is not in cache storage 120, the processor 110 cannot directly access the virtual memory address. Instead, the memory address translation needs to be fetched, increasing the time taken for the processor to read data from and/or write data out to the virtual memory address. Fetching the memory address translation may comprise accessing further storage comprising memory address translations, or performing a page walk of a master page table comprising memory address translations for a system comprising the apparatus 100. Prefetching the memory address translation may increase the efficiency of the apparatus 100 when implementing the at least one layer of the CNN. When implementing CNNs, a large number of memory accesses may be performed and where these memory accesses are scattered throughout the memory, prefetching the memory address translations may increase the efficiency of the system.

Figure 2:
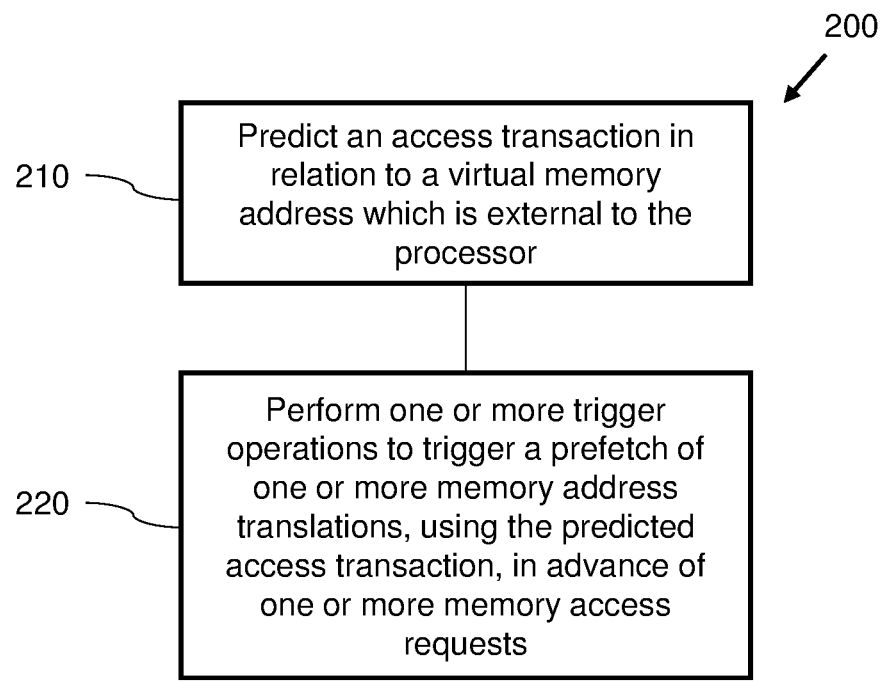
FIG. 2 is a flow diagram illustrating a method according to an example.

FIG. 2 is a flow chart of a method 200 for managing memory access for implementing at least one layer of a CNN on input data to generate output data using a processor. At block 210 the method comprises predicting an access transaction in relation to a virtual memory address which is external to the processor. At block 220 the method comprises, in response to the predicting, performing one or more trigger operations to trigger a prefetch of the one or more memory address translations, using the predicted one or more memory addresses, in advance of the one or more memory access requests. The memory management unit may then store the memory address translation in the cache storage 120 in advance of the predicted access transaction. Triggering a prefetch causes the storage of the memory address translation in the cache storage 120 in advance of the predicted access transaction may reduce the time taken for a read and/or write operation to be performed. Predicting an access transaction is possible in situations where memory access commands can be substantially deterministically processed, for example when implementing CNNs.

Figure 3:
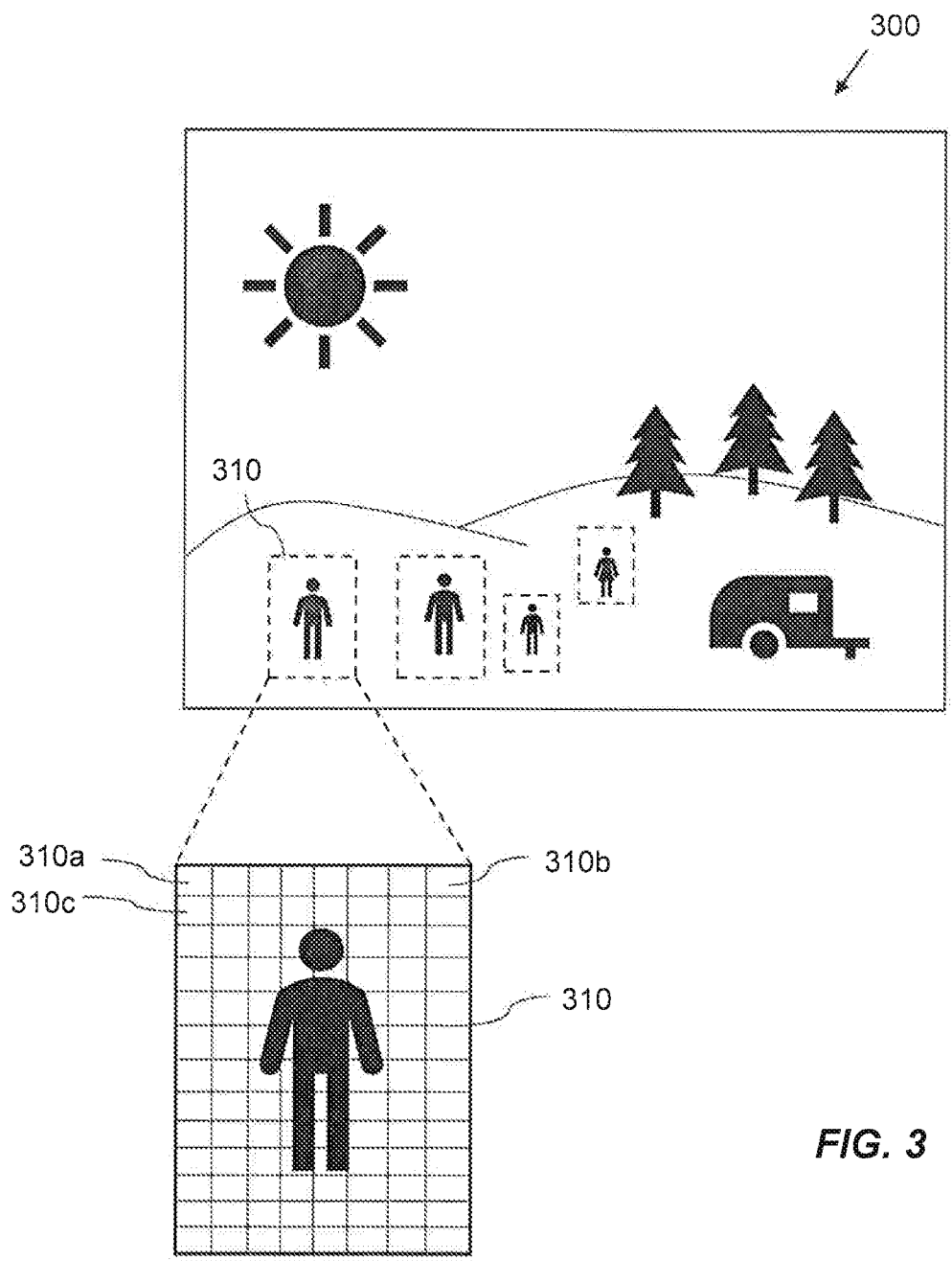
FIG. 3 is a schematic diagram of an image to be processed using a convolutional neural network according to an example.

FIG. 3 shows, schematically, an image 300 represented by image data. The image data may comprise a plurality of pixel intensity values representing a plurality of pixel locations. The pixel intensity values representing the image 300 may be stored in memory in contiguous blocks. For example, the pixel intensity value of each pixel location may be stored in memory contiguously with pixel intensity values representing horizontally adjacent pixel locations. Memory may comprise any suitable memory including random-access memory (RAM), read-only memory (ROM), video random-access memory (VRAM), synchronous dynamic random-access memory (SDRAM), or any other suitable type of memory.

In the example shown in FIG. 3, the image 300 has already been partially processed, for example, using a neural network, to detect objects in the image and classify them. The results of a detection of objects and classification of the objects are shown in FIG. 3 with broken boxes identifying the regions of the image in which people have been detected. These identified regions of the image may then be processed using a CNN to identify the people in the image. In this example, the CNN is to be implemented on the image data representing the identified regions to identify the people in those regions. When implementing the at least one layer of the CNN on the image data representing the region 310, a first portion of data representing a pixel location 310a may be accessed first and then portions of data representing the pixel locations along the same row may be accessed sequentially. Portions of data representing the horizontally adjacent pixel locations may be stored contiguously such that there is little processing involved in locating those portions of data representing the pixel locations between 310a and 310b. However, the portion of data representing the next line, starting at pixel location 310c may not be stored contiguously in physical memory with the portion of data representing pixel location 310b. Hence, a fetch operation may be performed to fetch the memory address translation corresponding to a virtual memory address comprising data representing pixel location 310c. Predicting an access transaction relating to the virtual memory address comprising the image data representing the pixel location 310c and triggering a prefetch of a memory address translation corresponding to that virtual memory address in advance of the predicted access transaction may prevent having to wait for the memory address translation to be determined before accessing the relevant portion of memory. In some examples, predicting an access transaction in relation to a virtual memory address which is external to the processor is based on at least one characteristic of the input data. The CNN may be used to process a variety of different types of input data. Characteristics of the input data may also affect the access patterns and may be used in predicting an access transaction in relation to a virtual memory address. In some examples, the at least one characteristic of the input data includes a storage configuration of the input data in memory which is external to the processor. That is to say, the characteristic of the input data may include how the input data is stored, such as whether the input data is stored contiguously, whether it is stored in a specific pattern, whether the input data is stored in blocks which are not contiguous with one another, and other conceivable arrangements. Other characteristics of the input data which may be used to predict an access transaction may include what type of data the input data is, and other characteristics which may be used to predict that a virtual memory address is likely to be accessed.

In cases in which compression is used, it may however be that a predicted virtual memory address may in fact not be used. Hence, a prefetch of a predicted virtual memory address may be triggered but not subsequently used. By monitoring a sequence number of commands relating to virtual memory addresses which are used, an unused predicted virtual memory address may be discarded based on its sequence number having been superseded.

The method may also be used where the image data is stored according to a different rotation in which it will be used by the CNN. For example, where the image data is stored row major but is read column major for processing. This also applies to the output data, for example, where the output data is image data, and the output data is generated column major but stored row major.

Figure 4A:
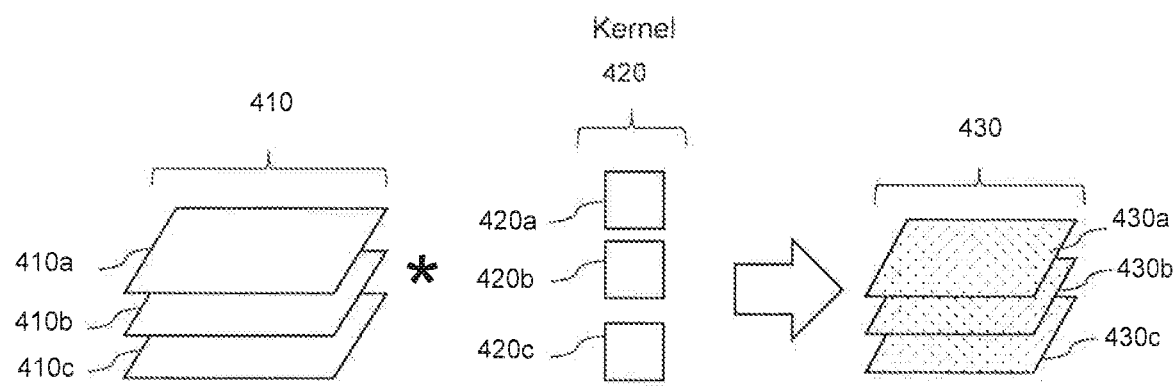
FIG. 4A is a schematic diagram illustrating an implementation of a simplified convolutional neural network, according to an example.

FIG. 4A is a schematic diagram illustrating an implementation of a layer of a simple CNN. The example shown in FIG. 4A will be discussed in relation to image data, however, it will be appreciated that the features described herein may also be applied to other data types, for example audio data.

FIG. 4A shows input data 410 comprising a plurality of parts 410a, 410b, 410c. For example, the input data 410 may be image data comprising a plurality of pixel intensity values representing a plurality of pixel locations. Each part, 410a-410c, may represent a different color channel. The input data 410a may comprise pixel intensity values corresponding to a green channel, input data 410b may comprise pixel intensity values corresponding to a red channel, and input data 410c may comprise pixel intensity values corresponding to a blue channel. The CNN may comprise a plurality of filters 420 representing a kernel. The kernel is used to identify a given type of feature in the input data 410. Each filter, 420a, 420b, 420c may correspond to a respective color channel and may be represented by a matrix. The filters 420 may be used to process the input data 410 to detect features in the image. When implementing the layer of the CNN, a convolution between the filter 420a is performed on a first portion of the part 410a of the input data 410, wherein a convolution is the process of adding each element of the input data 410a which overlaps with an element in the filter 420a to its local neighbors, weighted by the respective elements of the filter 420a. The filter is then shifted to a second portion of the input data 410a and the process is repeated. The increment with which the filter 420a is shifted may be referred to as the stride. Performing this process until the filter 420a has been applied to all of the input data 410a, according to its size and stride, will result in output data 430a. This process is performed for each color channel resulting in the output data 430 comprising a plurality of parts 430a, 430b, 430c, corresponding to respective color channels. In practice, the filters 420a, 420b, and 420c may be treated as a single kernel wherein the convolution is performed between the kernel and all of the layers of the input data at once. In this case the results across layers may be combined such that a single output feature map may be generated, i.e. an output feature map having a single part. The output data 430 may be further processed or modified.

Figure 4B:
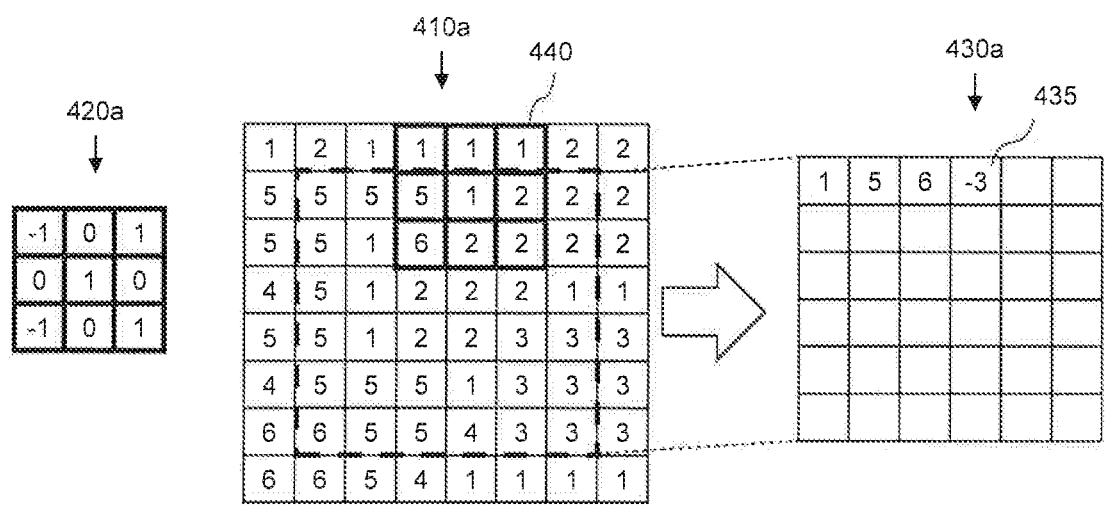
FIG. 4B is a schematic diagram illustrating a convolutional process, according to an example.

FIG. 4B shows schematically a convolution process in more detail. FIG. 4B shows a filter 420a which is applied to input data 410a. The filter 420a in FIG. 4B is being applied to the input data 410a with a stride of 1 such that the resulting output data 430a will have smaller dimensions than the input data 410a. In other examples, it may be possible to maintain the dimensions between the input data 410a and the output data 430a by applying padding to the input data 410a. The size of the output data 430a may also be reduced by pooling. At each position of the filter 420a, the values in the input data 410a which overlap with the filter will be summed according to the weights of the filter 420a. For example, at position 440 the output data which is generated by the convolution comprises a value −3 shown in the output data 430a at location 435. This value is determined by performing the following:

$$[(-1)*1]+[(0)*1]+[(1)*1]+[(0)*5]+[(1)*1]+[(0)*2]+ [(-1)*6]+[(0)*2]+[(1)*2].$$

The example discussed with reference to FIG. 4B shows only a single channel of the input data and the kernel being used. As discussed above, in practice, the filters 420a, 420b, and 420c may be used as a single kernel. In this case, the result of the above computation would be accumulated with similar computations for the other channels.

The operations performed on the input data when implementing the at least one layer of the CNN may affect the order in which virtual memory addresses are accessed. In an example, implementing the at least one layer of the CNN comprises performing a plurality of operations on the input data, each operation is performed on at least part of the input data in a plurality of portions. Relating this to the example of FIG. 4, a part of the input data may relate to the part 410a. The plurality of operations may involve each convolution of the filter 420a with a portion of the input data 410a. The memory accesses which are performed to implement the at least one layer of the CNN in this case may be determined by the amount and/or order in which output data is generated and the amount and/or order in which input data is accessed. The predicted virtual memory addresses may also be determined by the amount and/or order in which kernels representing the CNN are accessed. The size of a kernel 420 may affect the size of the output data 430.

In some examples, the predicted virtual memory addresses may be determined bases on an order in which portions of the input data are to be accessed to implement the at least one layer of the CNN. The order in which portions of input data are accessed may be related to an order in which operations on the input data to generate output data are performed to implement the at least one layer of the CNN. Where the input data is too large to be held in on-board storage in the processor the input data may be streamed when implementing the at least one layer of the CNN. That is to say, the input data may be segmented, and the at least one layer of the CNN may be implemented on the segmented portions separately with the results being stored in order, or combined, at the end. The order in which the portions of input data are to be accessed may be dependent on the way the input data is segmented. In one implementation the input data may be streamed in different channels, for example where the input data is image data, the image data may be split into a plurality of channels. In other implementations, the input data may be streamed in groups of channels. The example shown in FIG. 4A illustrates input data 410 split into three channels but in some applications the data may be split into more parts than this, for example sixty-four parts. In this example, streaming the input data may involve first operating on the first thirty-two parts and subsequently operating on the second thirty-two parts. In other implementations, the input data may be segmented into tiles. For example, where the input data represents an image, the image may be split into a plurality of parts which at least partially overlap. The CNN may be implemented on each of the plurality of parts separately and then combined at the end. In some examples, the CNN is to be implemented on input data which is stored as part of a larger data set.

Figure 5:
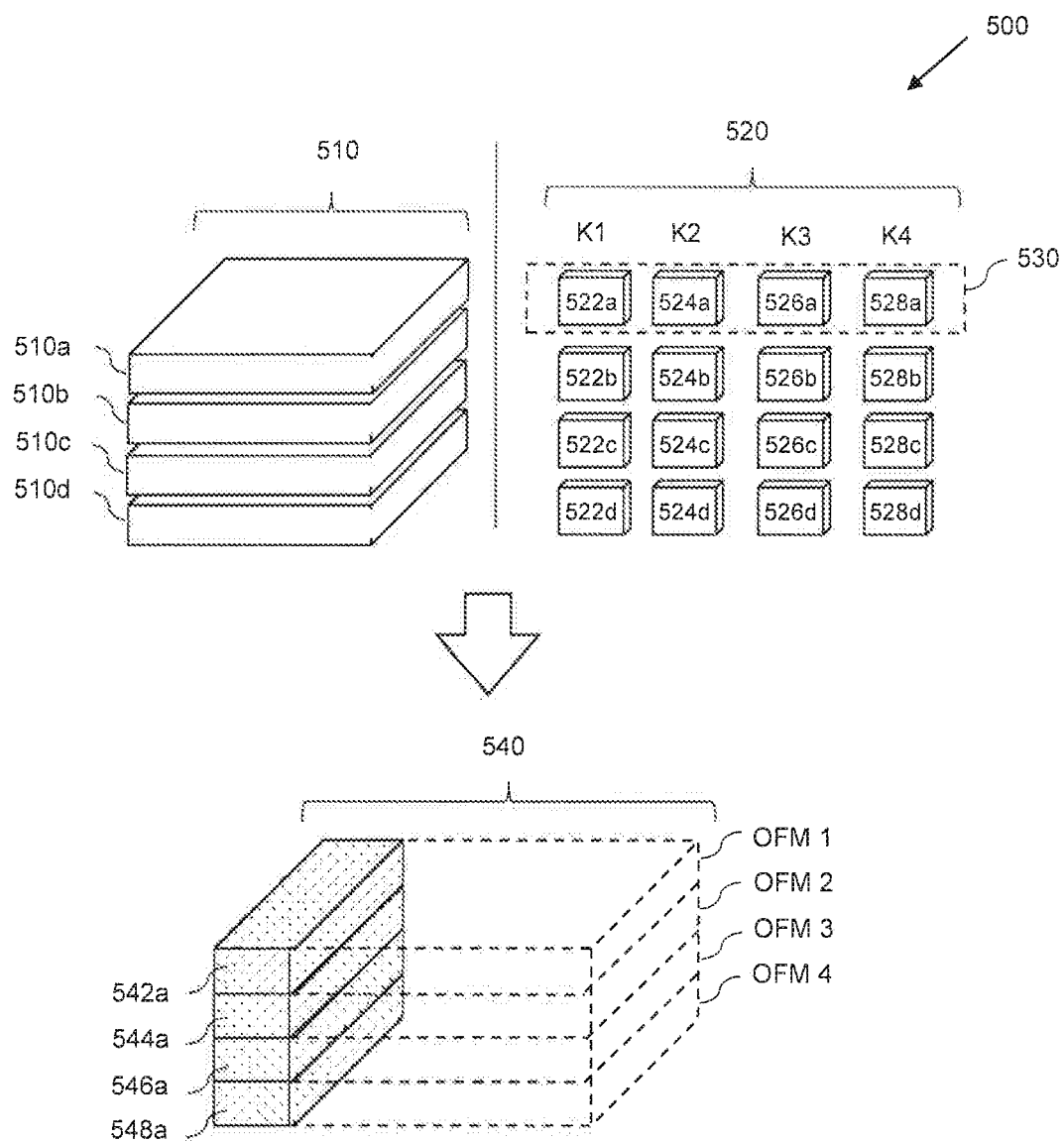
FIG. 5 is a schematic diagram of illustrating an implementation of a convolutional neural network according to an example.

FIG. 5 shows schematically an implementation of a CNN 500 comprising a plurality of feature maps in a first layer of the CNN. As discussed above, when implementing at least one layer of a CNN, it may not be possible to store all of the input data and data corresponding to the kernels in the memory on the processor. This may be overcome in a variety of ways, including input streaming, weight streaming, or a combination of the two. In examples where the input data cannot all be stored in the memory on the processor, the input data may be divided into multiple planes and may be fetched one-by-one, this may be called input streaming. FIG. 5 shows the input data 510, which is divided into multiple parts 510a, 510b, 510c, 510d to be sent to the processor sequentially. If it is not possible to store data corresponding to all of the kernels of the CNN in the memory on the processor then weight streaming may be used. Weight streaming is a process whereby data corresponding to the kernels, for example weights which make up the kernels, is sent to the processor in parts. Data representing at least part of the CNN may include, weights, bias data, and other data representing the CNN. The kernels 520 are divided into parts and the parts are fetched one-by-one. FIG. 5 shows a set of kernels 520 which are comprised in a first layer of the CNN. Each kernel may be split into parts, for example a kernel K1 is split into a plurality of parts 522a, 522b, 522c, 522d. In the example shown in FIG. 5, the kernels are split into parts which correspond to the dimensions of divided input data. The part 522a of kernel K1 may be applied to the input data 500a, part 522b of kernel K2 may be applied to the input data 500b, part 522c of kernel K3 may be applied to the input data 500c, and part 522d of kernel K4 may be applied to the input data 500d. In the example shown in FIG. 5, the parts of the kernels K1 to K4 in the region 530 shown in broken lines may be a first set of the parts of the kernels which are fetched and used by the processor when weight streaming. Subsequently, the next set of the parts of the kernels which are fetched may be parts 522b, 524b, 524c, and 524d. Alternatively, the parts of the kernels may be fetched in a different order, for example, the parts 522a, 522b, 522c, and 522c may be the first set of the parts of the kernels which are fetched when weight streaming. The subsequent set of parts of the kernels may comprise 524a, 524b, 524c, and 524d. The weight streaming may proceed in this way until all the convolutions have been performed.

The output data generated by performing convolutions between kernels K1 to K4, representing corresponding feature maps, with the input data 510 may be used as the input to a further layer of the CNN. If weight streaming is used to implement the at least one layer of CNN, then the order in which data will be written out may be out of order when compared with the order in which it will be read in for the next layer of the CNN. This can be seen in FIG. 5, where the output data 540, generated by performing a convolution between the parts 522a, 524a, 526a, 528a and the input data, is shown below the input data 510 and the set of kernels 520. When using the output data 540 as input to the next convolutional layer it may be input streamed according to the planes shown in broken lines at 540. Consequently, it is desirable to store the data which is comprised in each plane contiguously. When a first portion of data 542a is generated it may be written to a first portion of memory. The first portion of memory may be a first part of a block of memory for storing the data corresponding to the horizontal plane OFM 1. An access transaction relating to a virtual memory address for storing a second portion of data 544a is predicted and, in response to this prediction, an operation may be performed to trigger a prefetch of the one or more memory address translations corresponding to a virtual memory address. Once the memory address translation has been fetched, it may be stored at the start of a next block of memory for storing the data corresponding to the next horizontal plane OFM 2. This process may be repeated for the next two portions of output data 546a and 548a. The process is then repeated for the next set of parts of the kernels K1 to K4 which are weight streamed. The result of such an operation is that the portions of data 542a, 544a, 546a, 548a, are not stored contiguously with one another. Instead, they are stored in an order in memory which corresponds to an order in which they will be read when used as the input for a next layer of the CNN.

In an alternative arrangement, output data generated when performing convolutions between the kernels and the input data may be stored in memory in the same order in which it is generated. In order to efficiently stream this data as the input to a further layer of the CNN, a memory access management scheme as described above may be used for the input. A first virtual memory address may be accessed to read a first part of input data. An access transaction relating to a second virtual memory address may be predicted. In response to this prediction, an operation to obtain and store a memory address translation for the second virtual memory address in the cache storage may be performed in advance of the predicted access transaction relating to the second virtual memory address. This may allow the corresponding physical memory to be quickly accessed and the data therein read, without the added delay of waiting for the memory address translation to be obtained.

In some examples, the operation to trigger a prefetch of the memory address translation corresponding to the virtual memory address in the storage is a write operation, wherein the write operation is an empty write operation such that no data is written to the virtual memory address. The empty write operation may also be referred to as a dummy write operation. The dummy write operation may be a write transfer in which all byte lane strobes are LOW such that no data is written to memory. The empty write operation may be performed by the processor, for example by a thread in the processor which is dedicated to performing empty write operations to populate the storage with memory address translations. Empty write operations may be used due to their interoperability with contemporary memory management units. Using an empty write operation may prevent the need for reconfiguring other hardware and/or software to be compatible with the memory access management scheme described herein. An empty write operation may be used regardless of the type of access transaction which is predicted; indeed only the virtual memory addresses which may be used in a predicted access transaction may be predicted rather than the type of access transaction or the access transaction itself.

In some examples, the operation to trigger a prefetch of the memory address translation corresponding to the virtual memory address in the storage is a read operation, wherein the read operation is a dummy read operation using the virtual memory address. After performing the dummy read, any returned read data can be discarded.

In some examples, the operation to trigger a prefetch of the memory address translation corresponding to the virtual memory address in the storage is a custom operation for triggering the prefetch of the memory address translation in the storage. Using a custom operation for triggering a prefetch of a memory address translation may allow the operation to forgo surplus communications protocols and consequently increase the efficiency of the operation. An example of a custom operation for triggering a prefetch of a memory address translation includes the "StashTranslation" transaction provided in the Advanced Microcontroller Bus Architecture (AMBA) 5 Specification—"*AMBA AXI and ACE Protocol Specification* (AXI3, AXI4, AXI5, ACE and ACE 5)"—ARM IHI 0022F.b (ID122117) published in 2017. The StashTranslation transaction, as discussed in the above referenced document, may be used to indicate to a memory management unit that a translation is to be obtained for an address supplied with the transaction. The StashTranslation transaction has no associated data transfers. The address and control information are provided on the address write (AW) channel. A single response is provided on the write response (BRESP) channel. The response is provided after the address has been accepted. In other cases, different custom operations may be used. In some examples, the custom operation may be capable of performing other functions as well.

Figure 6:
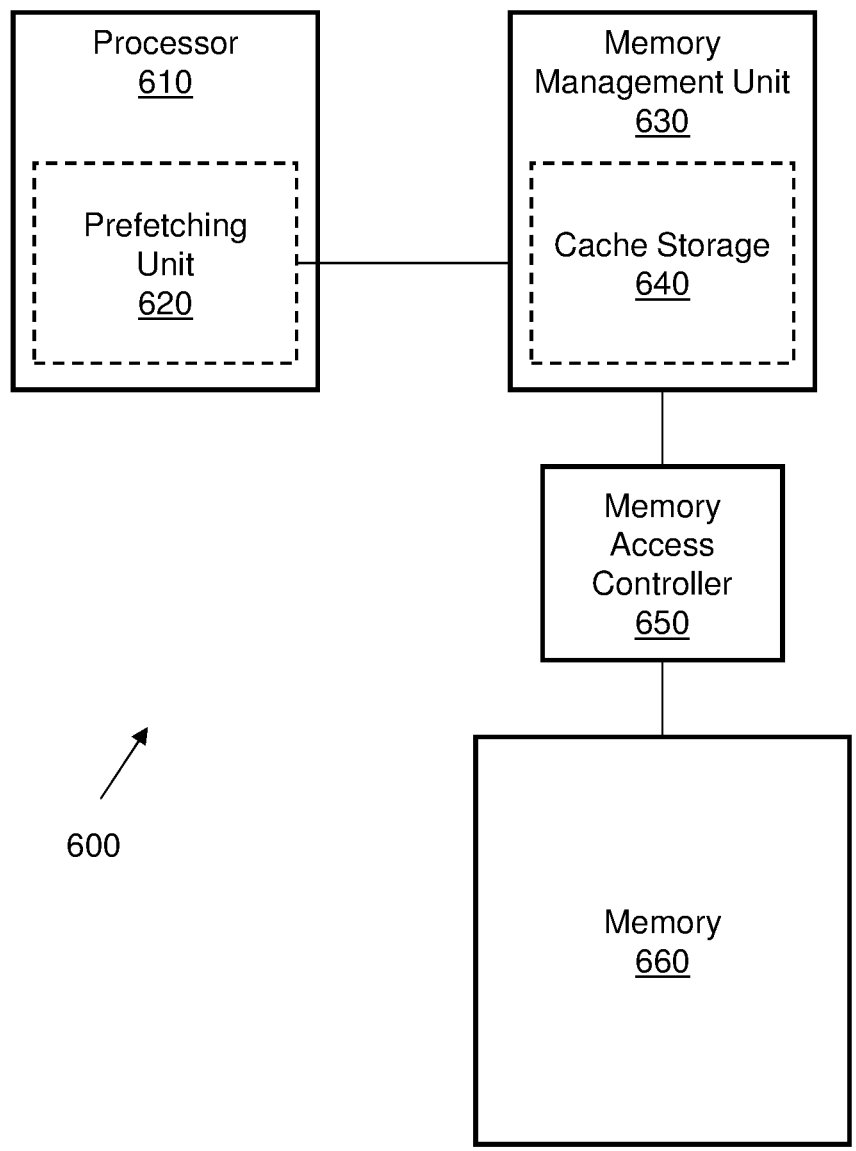
FIG. 6 is a schematic diagram of a system comprising features according to examples.

FIG. 6 is a simplified schematic diagram of an example system 600. FIG. 6 shows a processor 610 for implementing at least a layer of a CNN. The processor 610 comprises a prefetch unit 620. The prefetch unit 620 is configured to predict one or more memory addresses, for which one or more memory address translations are likely to be required by a memory management unit 630. The prefetch unit 620 is further configured to trigger operations to trigger a prefetch of the one or more memory address translations using the predicted one or more memory addresses in advance of one or more memory access requests. The prefetch unit 620 shown in FIG. 6 comprises circuitry configured to predict memory address translations for use by the processor 610 at least when implementing the at least one layer of a CNN. The system memory management unit 630 comprises cache storage 640, for example a translation lookaside buffer. The cache storage 640 may store a number of memory address translations. For example, the storage 640 may store memory address translations corresponding to those used by a plurality of processors and/or processes. That is to say the system memory management unit may serve a plurality of processors. Using the prefetch unit 620 may allow quicker determination of the memory address translations as data representing at least one layer of a convolutional network is typically deterministic, and thus predicting a memory translation in advance of the memory access request is possible. A memory access controller 650 is provided which is coupled to memory 660, for example DRAM. In an example, the processor may attempt to access a virtual memory address to retrieve data from the DRAM to implement at least one layer of a CNN.

In the system 600, the prefetch unit 620 is accessed to predict a memory address translation corresponding to the virtual memory address. Without the prefetch unit 620, the relevant memory address translation cannot be prefetched, and so the cache storage 640 may be scanned to determine the relevant memory address translation. If the translation lookaside buffer 640 does not comprise the relevant memory address translation, then a page table walk is performed on a master page table comprising memory address translations for the system 600, for example at the memory 660. This process increases the time taken to determine the relevant memory address translation. It is desirable to predict, and trigger a prefetching operation, for the relevant memory address translations using the prefetch unit 620 before they are needed by the processor 610 to implement the at least one layer of the CNN.

Figure 7:
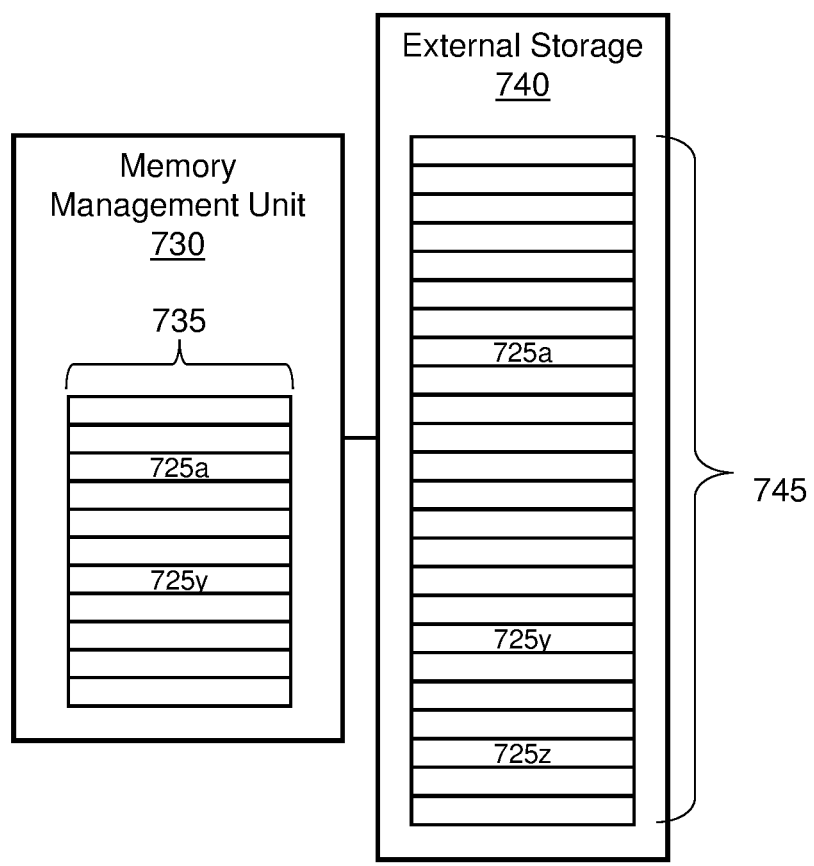
FIG. 7 is schematic diagram of a system comprising features according to examples.

FIG. 7 shows schematically a memory management unit 730 comprising cache storage 735 holding a first plurality of memory address translations exemplified by two memory address translations 725*a*; 725*y* and external storage 740 holding a master page table 745 comprising a second plurality of memory address translations including the two memory address translations 725*a*; 725*y*. Examples comprise predicting a soon-to-be-required memory address translation 725*z* which is held in the master page table 745, but not in cache storage 735. Triggering a prefetch of the predicted memory address translation 725*z* allows the predicted memory address translation 725*z* to be stored in the cache storage 735, local to the memory management unit 730, before it is needed.

The cache storage 735 may be of a fixed size, so it is an advantage for the prefetching not to be done too far ahead of the predicted memory addresses being used; otherwise a prefetched address which is held in the cache storage 735 but not yet used may be removed to make space for newly prefetched memory address translations.

On the other hand, once a prefetched address has been used, it can be determined that a memory address translation for which a prefetch has been previously triggered, may be prioritized for removal from the cache storage 735. In an example, the method comprises triggering the removal of the predicted memory address translation 725z from the cache storage 735, after it has been used by the memory management unit 730.

The examples described herein may also be used where the input data and/or the output data are compressed. Some methods of compression of data are deterministic and hence can be factored into a prediction of an access transaction. In such cases the memory address translations which are prefetched may correspond to the starting address of compressed blocks which are to be read or written out.

Figure 8:
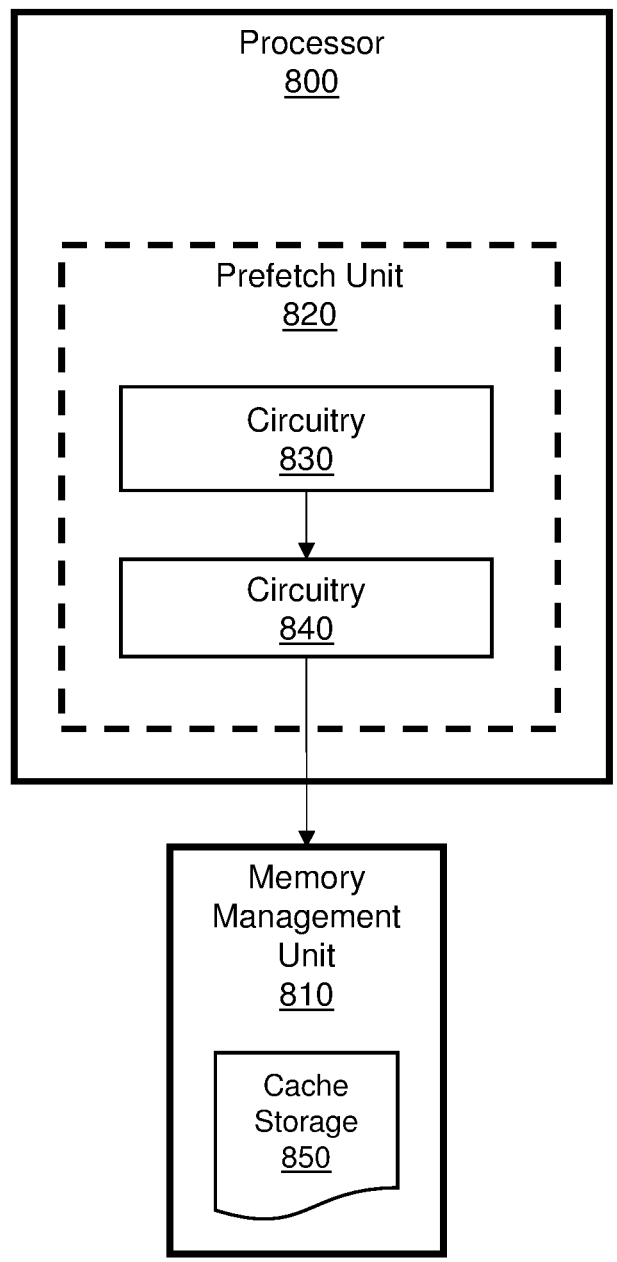
FIG. 8 is a schematic diagram of a non-transitory computer-readable storage medium according to an example.

FIG. 8 shows a schematic view of an example data processing system including processor 800 and memory management unit (MMU) 810. The processor 800 comprises a memory access component, for example a direct memory access (DMA) controller. The data processing system also typically includes a central processing unit (CPU). In this case, the DMA controller allows the processor to access the memory management function separately from the CPU. The processor may comprise a neural processing unit (NPU), or a different type of processor.

The processor 800 includes an apparatus, in the form of circuitry, referred to herein as a prefetch unit 820. The prefetch unit 820 comprises functional blocks, embodied in circuitry, shown in blocks 830 and 840. The circuitry at block 830 predicts an access transaction in relation to a virtual memory address which is external to the processor 800 based on command data from one or more memory access commands in a sequence of memory access commands for a memory access component (not shown) in the processor 800. The sequence of memory access commands may relate to instructions, to be performed by the processor 800, which implement at least one layer of a CNN. The circuitry at block 840 causes the processor 800 to, in response to the predicting, perform one or more trigger operations to trigger a prefetch of the one or more memory address translations by the MMU 810. The memory address translation(s) may thus be stored in cache storage 850 in advance of the predicted memory access requests, sent from the processor 800 to the MMU 810.

The memory access commands issued by the processor 800 may relate to any of a read operation, a write operation, and a custom operation. For example, these operations may be involved in the implementation of at least one layer of a CNN. The memory access component provides memory access requests to the MMU 810, which has access to a master page table used for translating the virtual memory addresses received in memory access requests from the processor 800 to physical memory addresses in system memory, i.e. one or more storage components external from the processor. As has been discussed above, the process of locating the appropriate memory address translation from the master page table can be slow. Triggering a prefetch of the address memory translations may speed up the process of accessing memory, allowing the processor 800 to perform more efficiently.

Figure 9:
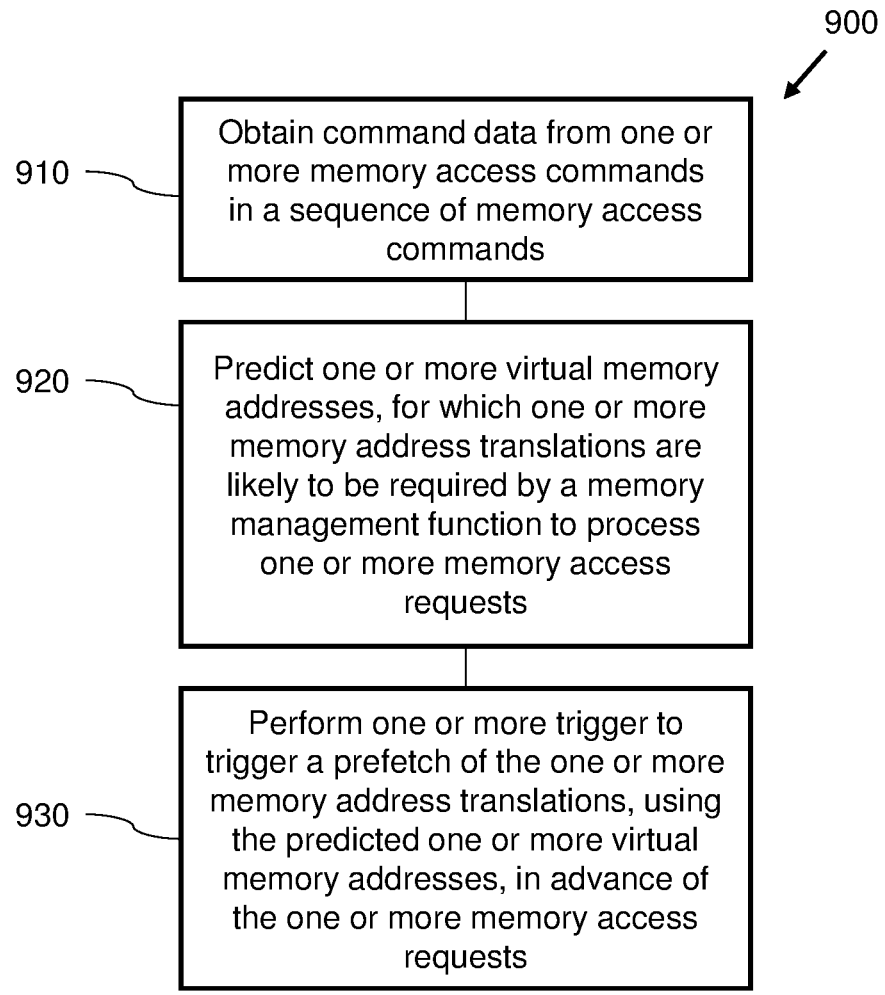
FIG. 9 is a flow diagram illustrating a method according to an example.

An example method of triggering prefetching of memory address translations will now be discussed with reference to FIG. 9. FIG. 9 is a flow chart of an example method 900 for triggering prefetching of memory address translations for memory access requests to be issued by a memory access component of a processor in a data processing system to a memory management function in the data processing system.

When a processor requires memory access, whether it be a read, write or custom operation, it issues one or more memory access commands, which are stored in the processor as a sequence of memory access commands for the memory access component of the processor. The memory access commands are encoded commands that the memory access component interprets to generate corresponding memory access requests. The memory access commands are of a higher granularity than the memory access requests, and there is typically a one-to-many relationship between them. In step 910, command data is obtained from one or more memory access commands in the sequence of memory access commands. The sequence may comprise an order in which the memory accesses are requested by the processor.

In step 920, one or more virtual memory addresses, for which one or more memory address translations are likely to be required by the memory management function to process one or more memory access requests, are predicted from the obtained command data. As has been discussed above, memory accesses which are performed by the processor when implementing the at least one layer of the CNN may be deterministic. The deterministic nature of the memory accesses may allow for their corresponding memory address translations to be predicted from the queued command data before they are requested by the memory access component.

In step 930, in response to the predicting, one or more trigger operations are performed to trigger a prefetch of the one or more memory address translations, using the predicted one or more virtual memory addresses, in advance of the one or more memory access requests. Based on the predicted memory address translations, the prefetch unit performs one or more trigger operations. The one or more trigger operations may be performed in a certain order based on the sequence of memory access commands. The one or more trigger operations trigger a prefetch of one or more memory address translations in storage of the memory management function. The prefetch unit is configured to run ahead of the memory access component so that the prefetch of the one or more memory access translations can be performed before they are required by the memory access component.

As a result of prefetching, when the memory access component issues a memory access request based on memory access commands issued by the processor, the one or more memory address translations will be available immediately for the corresponding memory access requests. The one or more trigger operations may be performed via a StashTranslation transaction. As has been discussed above, the StashTranslation transaction may be used to indicate to a memory management function that a translation is to be obtained for an address supplied with the transaction.

The method may further comprise monitoring one or more indicators of progress of the memory access component in processing the sequence of memory access commands. The prefetch unit may be coupled to the output of the memory access component so that the most recent memory access request issued processed by the memory access component can be determined. Based on this determination, the prefetch unit can determine whether it is running ahead of the memory access component and therefore whether to perform the one or more trigger operations. The one or more indicators of progress may comprise an address-related indicator of progress derived from a memory access request issued by the memory access component. The address-related indicator of progress may comprise a memory address contained within the memory access request issued by the memory access component. Additionally, or alternatively, the one or more indicators of progress may comprise a sequence-related indicator of progress related to the progress of the memory access component in processing the sequence of memory access commands in the memory access command queue. The sequence-related indicator may comprise a sequence number derived from the sequence of memory access commands. The one or more indicators of progress may comprise both an address-related indicator of progress derived from a memory access request issued by the memory access component, and a sequence-related indicator of progress related to the progress of the memory access component in processing the sequence of memory access commands in the memory access command queue.

The method may comprise obtaining command data from a plurality of memory access commands in the sequence of memory access commands. In this case, a plurality of memory addresses may be predicted, for which a plurality of memory address translations are likely to be required by the memory management function to process a plurality of memory access requests. In this case, the method may further comprise performing a plurality of trigger operations to trigger a prefetch of the plurality of memory address translations, using the predicted plurality of memory addresses, in advance of each of the plurality of memory access requests respectively. Tracking data indicative of each of the plurality of predicted memory addresses after each of the plurality of trigger operations may then be stored to track the triggered prefetches. Generating such tracking data allows the prefetch unit to keep track of what predicted memory address have been triggered to be prefetched.

As discussed above, the method may comprise monitoring one or more indicators of progress of the memory access component in processing the sequence of memory access commands. The predicted memory address may then be filtered based on the monitoring of the one or more indicators of progress. A trigger operation relating to the predicted memory address may then be inhibited based on the filtered predicted memory address. For example, if the one or more indicators of progress indicate that the memory access component is ahead of the prefetch unit, then there may be no need to trigger prefetching of the plurality of memory address translations. The prefetch unit may then inhibit the trigger operation.

The filtering may be performed based on a sequence number in the sequence of memory access commands. In this case, the method further comprises identifying a sequence number, in the sequence of memory access commands, for a memory access command, to which the predicted memory address relates. The predicted memory address may then be filtered based on the monitoring and the sequence number to which the predicted memory address relates.

The tracking data may include address tracking data indicative of the predicted memory address. In this case, the method may involve comparing a predicted memory address, for which a memory address translation is likely to be required, to the address tracking data, and inhibiting a trigger operation relating to the predicted memory address based on the comparing.

The method may further involve monitoring one or more indicators of progress of the memory access component in processing the sequence of memory access commands and discarding at least some of the tracking data based on the monitoring. In this case, the method may comprise identifying a sequence number, in the sequence of memory access commands, for a memory access command, to which a predicted memory address relates, and discarding at least some of the tracking data based on the monitoring and the sequence number to which the predicted memory address relates. The discarding may be performed if it is determined that the memory access component is running ahead of the prefetch unit, in which case the triggering of the prefetch may not be required. The prefetch unit may be configured to perform the comparing, and thus whether at least some of the tracking data should be discarded.

The method may further comprise identifying a data characteristic relating to a memory access request for which data compression/decompression is enabled. The command data corresponding to the memory access request may comprise the data characteristic. One or more memory addresses, for which one or more memory address translations are likely to be required, may then be predicted based on the identified data characteristic. The prefetch unit may decode command data and determine potential memory access requests based on a worst case compression ratio and the monitor the progress of the memory accesses to determine those which are used in order to determine that those which are unused (due to a higher level of compression in practice than the worst case scenario) can be discarded. In the case of lossless compression, the worst case compression ratio may be 1:1, in that the compressed data may be the same size as the uncompressed data in the worst case. In that case, the predicted memory addresses may be the same as those that would be generated for uncompressed data. In the case of lossy compression, the predicted memory addresses may be smaller in number, corresponding to less data being involved in the memory access, than those that would be generated for uncompressed data.

In another implementation of the present disclosure, there is provided a method for triggering prefetching of memory address translations for memory access requests to be issued by a memory access component of a processor in a data processing system to a memory management function in the data processing system. The method comprises predicting one or more memory addresses, for which one or more memory address translations are likely to be required by the memory management function to process one or more memory access requests. In response to the predicting, one or more first trigger operations are performed to trigger a prefetch of the one or more memory address translations, using the predicted one or more memory addresses, in advance of the one or more memory access requests. The method further comprises performing one or more second trigger operations to trigger a discard of a selected element of the one or more memory address translations, after the memory access component has performed a memory access request for which the selected element was required.

The one or more second trigger operations may be performed based on a determination that a memory address translation is no longer needed. Typically, when the memory management function has obtained a memory address translation, it is stored in a cache of the memory management function. The cache may be limited by size restrictions of the memory. Therefore, it may be possible to discard memory address translations that have been used, and are determined not to be needed within a predetermined number of future operations. Because the prefetch unit is configured to run ahead of the memory access component, it can determine that once a given memory translation has been used, it may no longer be needed, i.e. no future memory accesses corresponding to the given memory address translation are predicted by the prefetch unit. In this case, the prefetch unit may perform the one or more trigger operations to trigger a discard of the given memory address translation. This frees up available storage in the cache of the memory management function, in a carefully controlled manner, by prioritizing certain memory address translations to be discarded over others which might otherwise be discarded. This allows further memory address translations to be stored in the memory management unit, allowing the prefetch unit to run further ahead, without requiring the discard of potentially useful memory address translations which may be re-used.

In another example, the one or more trigger operations may correspond to one or more memory access requests that were not then issued by the memory access component. In this example, the memory access component may detect that the memory access command has passed where a selected memory address translation may have been required. In this case, the one or more second trigger operations may discard the selected memory address translation.

Figure 10:
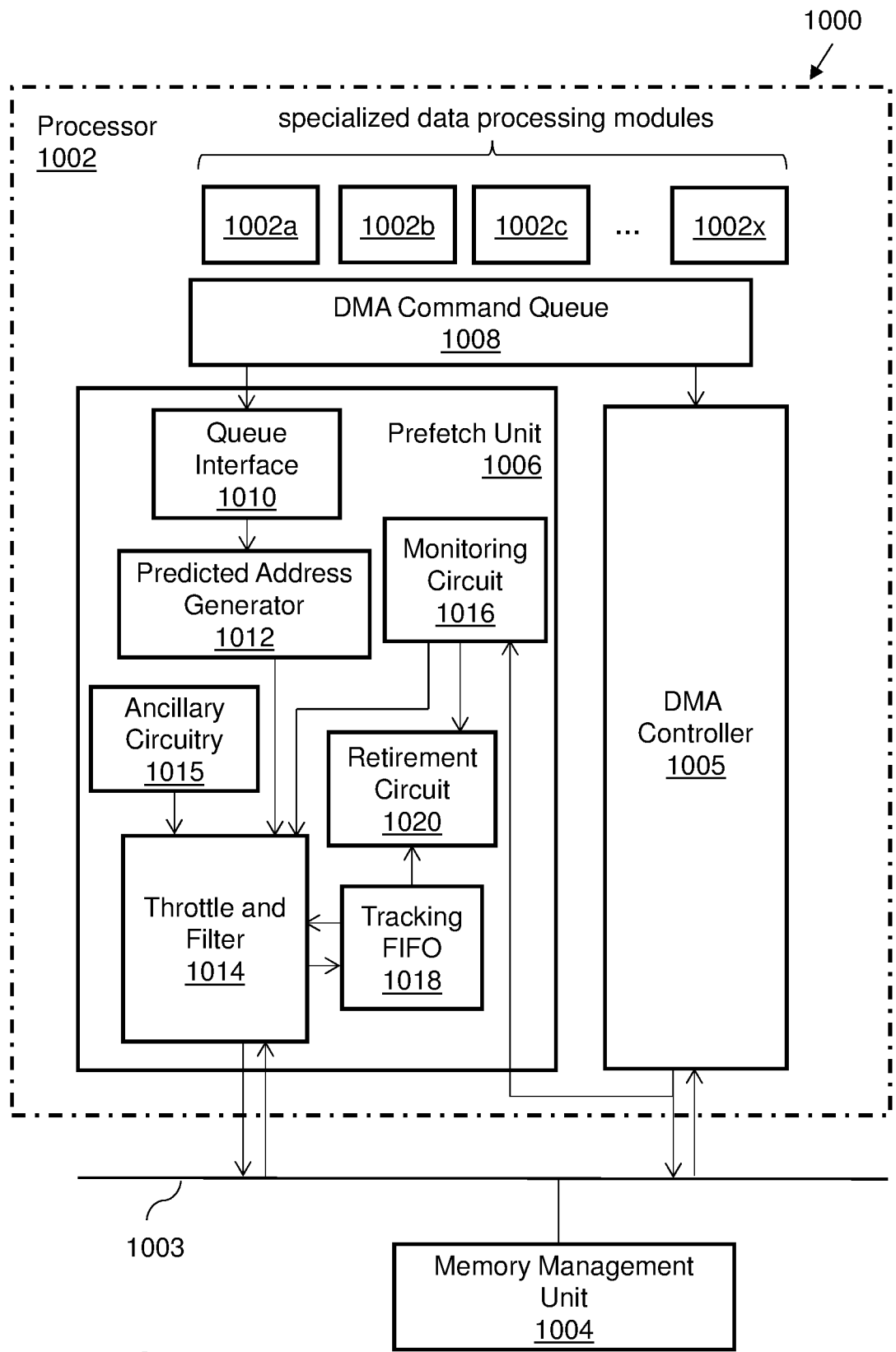
FIG. 10 is a schematic diagram of a system comprising features according to examples.

FIG. 10 is a simplified schematic diagram of an implementation of a data processing system 1000 illustrating features of the present disclosure. The data processing system 1000 may be configured to perform the method 900 shown in FIG. 9. The data processing system 1000 may be comprised in a computing device, for example a smartphone, tablet device or general-purpose laptop computer. The data processing system 1000 comprises a processor 1002 and a memory management function, for example a memory management unit (MMU) 1004, which are each coupled to a system bus 1003. The MMU 1004 in this arrangement is otherwise known as a system memory management unit (SMMU) and provides access to system memory (not shown), for example dynamic random-access memory (DRAM), synchronous dynamic random-access memory (SDRAM), and/or any other suitable type of memory. Such system memory is referred to herein as external storage, since the storage is external to the processor 1002. The processor 1002 may include a single integrated circuit (IC) chip or a plurality of interconnected IC chips. The data processing system typically also comprises elements other than those shown, including a CPU, one or more user interface devices, and interfaces to other computational hardware.

The processor 1002 includes a plurality of specialized data processing modules 1002a; 1002b; 1002c; . . . for example convolutional engines (CEs), which rely on a memory access component in the form of a direct memory access (DMA) controller 1005 of the processor 1002 to transmit memory access requests to the MMU 1004. The modules 1002a; 1002b; 1002c; . . . may be controlled using a control unit 1002x in the processor 1002. The modules 1002a; 1002b; 1002c; . . . and/or the control unit 1002x may issue memory access commands to the DMA controller 1005 when following stored instructions, for example to execute a CNN. As discussed above, the memory access commands are encoded commands that the DMA controller 1005 interprets to generate the memory access requests for the MMU 1004, MMU 1004, which performs memory address translation in relation to these memory access requests.

The processor 1002 also includes apparatus, referred to herein as a prefetch unit 1006, which is configured for triggering prefetching of memory address translations for memory access requests to be issued to the MMU 1004 in the data processing system 1000. As shown, the MMU 1004 is separately coupled to the prefetch unit 1006 and the DMA controller 1005 via the system bus 1003. The prefetch unit 1006 interprets the memory access commands issued by the processor to predict the required address translations corresponding to the memory access requests issued by the DMA controller 1005. The prefetch unit 1006 may decode the commands and determine any strides, etc. to determine the corresponding memory access requests, and the monitor the progress of the memory accesses as they are issued by the DMA controller 1005.

The DMA controller 1005 is an example of a direct memory access (DMA) component that allows the processor 1002 to access the MMU 1004 separately from a CPU (not shown) in the data processing system 1000. That is, the DMA controller 1005 is configured to transfer data between the processor 1002 and locations in system memory, via the MMU 1004, without intervention of the CPU.

A sequence of memory access commands is stored in a DMA command queue 1008 for the DMA controller 1005. The DMA command queue 1008 comprises at least two read ports, one for the DMA controller 1005, and one for the prefetch unit 1006. As the prefetch unit 1006 may run ahead of the DMA controller 1005, the prefetch unit 1006 may obtain command data from the one or more memory access commands that precedes the processing of the command data by the DMA controller 1005 at any one time.

The DMA controller 1005 processes a series of memory access commands, in the order in which they are received from the DMA command queue 1008. The DMA controller 1005 issues corresponding memory access requests that are provided to the MMU 1004. The prefetch unit 1006 is configured to trigger a prefetch of the one or more memory address translations by the MMU 1004, in advance of one or more of these memory access requests.

The prefetch unit 1006 includes first circuitry 1010 for obtaining command data from one or more memory access commands in the sequence of memory access commands in the DMA command queue 1008. The first circuitry 1010 is referred to herein as a queue interface. The DMA command queue 1008 is coupled to the prefetch unit 1006 via the queue interface 1010. As the prefetch unit 1006 is configured to, where possible, run ahead of the DMA controller 1005, the queue interface 1010 may be configured to obtain command data from the DMA command queue 1008 that differs from command data from the DMA command queue 1008 concurrently being processed by the DMA controller 1005 at any one time.

The prefetch unit 1006 further includes second circuitry 1012 for predicting one or more memory addresses, for which one or more memory address translations are likely to be required by the MMU 1004 to process one or more subsequent memory access requests, from the obtained command data. The second circuitry 1012 is referred to herein as a predicted address generator. The predicted address generator 1012 is configured to iterate over memory addresses corresponding to command data derived from the one or more memory access commands by the queue interface 1010. In other words, the encoded commands constituting the memory access commands are interpreted by the predicted address generator 1012 to predict the required memory address translations.

As has been discussed above, memory access transactions which are performed by the processor 1002 when implementing the at least one layer of the CNN may be substantially deterministic. The deterministic nature of the memory accesses may allow for their corresponding memory address translations to be predicted before they are requested by the DMA controller 1005. The predicted address generator 1012 is configured to iterate over memory addresses associated with the command data corresponding to the one or more memory access commands. The predicted memory addresses may be stored in ascending order within each set of predicted memory addresses corresponding to the one or more commands. The resolution of the predicted memory addresses may correspond to the resolution of the master page table. In one example, each of the predicted memory address translations may be given with 4 Kilobyte (KB) resolution, though other examples are possible.

The prefetch unit 1006 further includes third circuitry 1014 for, in response to the predicting, performing one or more trigger operations to trigger a prefetch of the one or more memory address translations, using the predicted one or more memory addresses, in advance of the one or more memory access requests. The third circuitry 1014 is referred to herein as a throttle and filter. The throttle and filter 1014 is coupled to predicted address generator 1012 and is configured to receive command data and the predicted one or more memory addresses from the respective first and second circuits. The one or more trigger operations may be performed in a certain order based on the sequence of memory access commands. The one or more trigger operations may be performed by issuing a StashTranslation transaction to the MMU 1004. The StashTranslation transaction may be used to indicate to the MMU 1004 that a translation is to be obtained for an address supplied with the transaction. Alternatively, the one or more trigger operations may be performed by issuing a normal transaction with the MMU1004.

The throttle and filter 1014 may comprise ancillary circuitry 1015 in the form of a plurality of software-controlled registers which hold configuration settings for the throttle and filter 1014. These configuration settings control:

a) the throttling of triggers when a tracking FIFO (to be described below) is determined to hold a number of entries corresponding to a first configuration setting referred to herein as STASH_AHEAD; and b) the throttling of triggers when a number of triggers issued to the MMU 1004, but not yet acknowledged as having been processed, reaches a number of triggers corresponding to a second configuration setting referred to herein as STASH_ISSUE.

The prefetch unit 1006 includes fourth circuitry 1016 coupled to the output of the DMA controller 1005. The fourth circuitry 1016 is referred to herein as a monitoring circuit. The monitoring circuit 1016 is configured to monitor one or more indicators of progress of the DMA controller 1005 in processing the sequence of memory access commands, as discussed with reference to the method 900. The one or more trigger operations may then be performed by the throttle and filter 1014 based on the one or more indicators of progress. For example, based on the one or more indicators, the prefetch unit 1006 can determine whether it is running ahead of the DMA controller 1005 and therefore whether to perform the one or more trigger operations. In this case, the one or more indicators of progress may comprise an address-related indicator of progress derived from a memory access request issued by the DMA controller 1005. The address-related indicator of progress may comprise a memory address contained within the memory access request issued by the DMA controller 1005. Additionally, or alternatively, the one or more indicators of progress may comprise a sequence-related indicator of progress related to the progress of the DMA controller 1005 in processing the sequence of memory access commands in the DMA command queue 1008. The sequence-related indicator may comprise a sequence number derived from the sequence of memory access commands. The one or more indicators of progress may comprise both an address-related indicator of progress derived from a memory access request issued by the DMA controller 1005, and a sequence-related indicator of progress related to the progress of the DMA controller 1005 in processing the sequence of memory access commands in the DMA command queue 1008.

The prefetch unit 1006 further includes fifth circuitry 1018 coupled to the throttle and filter 1014. The fifth circuitry 1018 is referred to herein as a tracking FIFO. The tracking FIFO 1018 is configured to store tracking data indicative of each of the plurality of predicted memory addresses after each of the one or more trigger operations are performed. At least one of the throttle and filter 1014 and track FIFO 1018 may be configured to generate the tracking data. The tracking data may include address tracking data indicative of the predicted memory address.

The throttle and filter 1014 may be further configured to filter the predicted memory addresses. The predicted memory address may be filtered based on the monitoring of the one or more indicators of progress. The throttle and filter 1014 may further inhibit the trigger operation relating to the predicted memory address based on the filtered predicted memory address. The throttle and filter 1014 may identify a sequence number, in the sequence of memory access commands, for a memory access command, to which the predicted memory address relates. The predicted memory address may then be filtered based on the monitoring and the sequence number to which the predicted memory address relates.

The prefetch unit further includes sixth circuitry 1020, coupled to the monitoring circuit 1016 and tracking FIFO 1018. The sixth circuitry 1020 is referred to herein as a retirement circuit. The retirement circuit 1020 is configured to compare the one or more indicators of progress of the DMA controller 1005 monitored by the monitoring circuit 1016, with the tracking data generated by the tracking FIFO 1018. If it is determined that the tracking data is behind the one or more indicators of progress, the retirement circuit 1020 is configured to discard at least some of the tracking data. For example, if it is determined that the tracking data is behind the one or more indicators of progress, it can be determined that the prefetch unit 1006 is running behind the DMA controller 1005 in processing command data in the DMA command queue 1008, and therefore the prefetch unit 1006 does not need to store the tracking data indicative of the corresponding predicted memory address translations.

The retirement circuit 1020 may identify the sequence number, in the sequence of memory access commands, for a memory access command, to which a predicted memory address relates, and discard at least some of the tracking data based on the monitoring and the sequence number to which the predicted memory address relates. The retirement circuit 1020 may be further configured to perform a further one or more trigger operations to trigger a discard of a selected element of the one or more memory address translations, after the DMA controller 1005 has performed one or more predicted memory access requests for which the selected element was required.

In an example, a data processing system comprises a processor, a memory management function, and storage accessible by the processor via the memory management function. The processor is configured to trigger prefetching of memory address translations, for memory access requests to be issued by the processor to the memory management function, by obtaining instruction data from a sequence of instructions. The processor is further configured to predict one or more memory addresses, for which one or more memory address translations are likely to be required by the memory management function to process one or more memory access requests, from the obtained instruction data. The processor is further configured to, in response to the predicting, perform one or more trigger operations to trigger a prefetch of the one or more memory address translations, using the predicted one or more memory addresses, in advance of the one or more memory access requests.

The above examples are to be understood as illustrative examples of the present disclosure. Furthermore, equivalents and modifications not described above may also be employed without departing from the scope of the disclosure. For example, the memory address translations may be address translations between virtual memory addresses and further virtual memory addresses. This may be the case where, for example, a CNN is being implemented on one or more virtual machines. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

What is claimed is:

1. A method for triggering prefetching of memory address translations for memory access requests to be issued by a direct memory access, DMA, controller of a processor in a data processing system to a system memory management unit, SMMU, coupled to the processor via a system bus, in the data processing system, the method comprising:
   obtaining, by a prefetch unit coupled to an output of the DMA controller, a plurality of memory access commands in a sequence of memory access commands for the DMA controller;
   predicting, by the prefetch unit, one or more memory addresses, for which one or more memory address translations are to be required by the SMMU to process one or more memory access requests, from the obtained plurality of memory access commands;
   in response to the predicting, performing, by the prefetch unit, one or more trigger operations to trigger a prefetch of the one or more memory address translations, using the predicted one or more memory addresses, in advance of the one or more memory access requests;
   storing tracking data indicative of each of the one or more predicted memory addresses after each of the one or more trigger operations, to track the triggered prefetch;
   monitoring, by the prefetch unit, one or more indicators of progress of the DMA controller in processing the sequence of memory access commands from the output of the DMA controller, each indicator of progress comprising a memory address contained within a corresponding memory access request issued by the DMA controller;
   comparing the one or more indicators of progress with the tracking data;
   determining, by the prefetch unit and based on the comparing, that the prefetch unit is running ahead of the DMA controller;
   predicting, by the prefetch unit, a further memory address, for which a further memory address translation is to be required by the SMMU to process a further memory access request, from the obtained plurality of memory access commands; and
   in response to the predicting and in response to determining that the prefetch unit is running ahead of the DMA controller, performing, by the prefetch unit, a further trigger operation to trigger a prefetch of the further memory address translation, using the predicted further memory address, in advance of the further memory access request.

2. The method of claim 1, comprising:
   storing the sequence of memory access commands in a memory access command queue for the DMA controller; and
   obtaining the one or more memory access commands from the memory access command queue.

3. The method of claim 1, wherein the one or more indicators of progress comprise a sequence number derived from the sequence of memory access commands.

4. The method of claim 1, comprising:
   monitoring one or more further indicators of progress of the DMA controller in processing the sequence of memory access commands; and
   inhibiting a trigger operation relating to a subsequent memory address based on the monitoring.

5. The method of claim 4, wherein the method comprises:
   identifying a sequence number, in the sequence of memory access commands, for a memory access command, to which the predicted memory address relates; and
   filtering the predicted memory address based on the monitoring and the sequence number to which the predicted memory address relates.

6. The method of claim 1, wherein the tracking data includes address tracking data indicative of the predicted memory address, and wherein the method comprises:
   comparing a predicted memory address, for which a memory address translation is likely to be required, to the address tracking data; and
   inhibiting a trigger operation relating to the predicted memory address based on the comparing.

7. The method of claim 1, comprising:
   monitoring one or more indicators of progress of the DMA controller in processing the sequence of memory access commands; and
   discarding at least some of the tracking data based on the monitoring.

8. The method of claim 7, wherein the method comprises:
   identifying a sequence number, in the sequence of memory access commands, for a memory access command, to which a predicted memory address relates; and
   discarding at least some of the tracking data based on the monitoring and the sequence number to which the predicted memory address relates.

9. The method of claim 1, wherein the method comprises:
   identifying a memory access request corresponding to data for which data compression is enabled; and
   predicting one or more memory addresses, for which one or more memory address translations are likely to be required, based on the identifying.

10. The method of claim 1, wherein the method comprises:
    performing one or more further trigger operations to trigger a discard of at least a selected element of the one or more memory address translations, after the DMA controller has performed a memory access request for which the selected element was required.

11. A prefetch unit for triggering prefetching of memory address translations for memory access requests to be issued by a direct memory access, DMA, controller of a processor in a data processing system to a system memory management unit, SMMU, coupled to the processor via system bus, in the data processing system, the apparatus comprising:
    first circuitry for obtaining a plurality of memory access commands in a sequence of memory access commands for the DMA controller;

second circuitry for predicting one or more memory addresses, for which one or more memory address translations are to be required by the SMMU to process one or more memory access requests, from the obtained plurality of memory access commands;

third circuitry for, in response to the predicting, performing one or more trigger operations to trigger a prefetch of the one or more memory address translations, using the predicted one or more memory addresses, in advance of the one or more memory access requests;

fourth circuitry coupled to an output of the DMA controller, the fourth circuitry for, monitoring one or more indicators of progress of the DMA controller in processing the sequence of memory access commands from the output of the DMA controller, each indicator of progress comprising a memory address contained within a corresponding memory access request issued by the DMA controller;

fifth circuitry configured to store tracking data indicative of each of the one or more of predicted memory addresses after each of the one or more trigger operations are performed; and sixth circuitry configured to compare the one or more indicators of progress with the tracking data and to determine, based on the comparing, that the prefetch unit is running ahead of the DMA controller, wherein the third circuitry is further configured for, in response to the predicting and in response to the sixth circuitry determining that the prefetch unit is running ahead of the DMA controller, performing a further trigger operations to trigger a prefetch of a further memory address translations, using a predicted further memory address, in advance of further memory access requests.

12. A data processing system comprising:

a processor;

a system memory management unit coupled to the processor via a system bus; and storage accessible by the processor via the memory management unit, wherein the processor comprises the prefetch unit and controller of claim 11.

\* \* \* \* \*